United States Patent Office

3,415,619
Patented Dec. 10, 1968

3,415,619
PROCESS FOR MAKING AMMONIUM
PHOSPHATE
David M. Young, Sarnia, Ontario, Canada, assignor to
The Dow Chemical Company, Midland, Mich., a corporation of Delaware
No Drawing. Filed June 30, 1966, Ser. No. 562,451
8 Claims. (Cl. 23—107)

ABSTRACT OF THE DISCLOSURE

This invention relates to a process for the preparation of water-soluble ammonium phosphates by extracting a substantially iron-free aqueous phosphoric acid, derived from the reaction of a calcium phosphate-containing ore and a strong mineral acid, into a water-immiscible trialkyl phosphate extractant, separating the phosphoric acid-laden extractant from the residual aqueous phase, removing the calcium impurities therefrom, contacting the phosphoric acid-laden extractant with anhydrous ammonia at a temperature of between about 20 and 90° C. and separating solid, water-soluble ammonium phosphate from the extractant.

---

This invention relates to a process for the preparation of ammonium phosphates and more particularly is related to a process for the preparation of relatively pure, water-soluble ammonium phosphates from phosphate ores. The term "ammonium phosphate" as used herein includes both ammonium dihydrogen phosphate and diammonium phosphate.

Ammonium phosphates now normally are produced commercially by the reaction of ammonia with phosphoric acid in an aqueous solution. The phosphoric acid employed in such reaction is derived either by action of water on phosphorous oxides prepared by the electric furnace method and referred to as "electric furnace acid" or derived from the action of a mineral acid on a calcium phosphate-containing ore such as phosphate rock. Electric furnace acid is highly pure and reacts readily with ammonia in aqueous solution to produce a pure grade of ammonium phosphate. Electric furnace acid material is the only source of such ammonium phosphate which may be used in liquid fertilizer applications and it, therefore, commands a high price. The phosphoric acid derived from the action of mineral acids on calcium phosphate-containing ores is an impure material commonly referred to as "green acid" or "brown acid." Ammonia likewise reacts readily in aqueous solution with this form of phosphoric acid but it produces an impure ammonium phosphate which is not completely soluble in water and which can only be used in granular form as a fertilizer. No commercially acceptable method is available, therefore, for producing a water-soluble ammonium phosphate from phosphoric acid derived from the acidulation of calcium phosphate-containing ores.

It is an object of this invention to provide a process for the production of water-soluble ammonium phosphates. It is a further object of this invention to provide a process for the production of water-soluble ammonium phosphates from phosphoric acid derived from the acidulation of calcium phosphate-containing ores. These and other objects and advantages of the process will be readily appreciated and better understood by reference to the following detailed description.

It has now been discovered that a relatively pure water-soluble ammonium phosphate may be prepared by acidulating calcium phosphate-containing ore with a mineral acid, separating the insoluble residue, extracting the acidulation product with a water-immiscible organic extractant, treating the phosphoric acid-laden organic extractant to remove the iron and calcium values therefrom, treating the remaining phosphoric acid-laden organic extractant at a temperature of from 20 to 90° C. with sufficient ammonia to convert the phosphoric acid to the desired ammonium dihydrogen phosphate, diammonium phosphate or mixture thereof and separating the solid, water-soluble ammonium phosphate from the organic extractant. Alternatively, the impurity values, particularly iron, can be removed from the acidulation product prior to extraction with the water-immiscible organic extractant.

Calcium phosphate-containing ores suitable for use as raw material in this process include calcium phosphate in any of its known naturally-occurring forms such as fluorapatite, chlorapatite, hydroxymonazite, variscite and fairfieldite, as well as the phosphate-containing iron ores such as the $Fe_2O_3$-apatite mixed ores common to the Rocky Mountain states and the mixed aluminum phosphate-calcium phosphate materials such as the so-called "leached zone ore."

Phosphoric acid is produced from the above-defined calcium phosphate-containing ores by acidulation thereof with an aqueous solution of a strong mineral acid such as HCl, $H_2SO_4$ or $HNO_3$. The acid employed for such acidulation is usually employed in at least a stoichiometric amount with a slight excess over the stoichiometrically required quantity being usually preferred. The phosphoric acid thus produced is substantially saturated with metal ions and is usually in admixture with the insoluble portion of the ore, various ionizable inorganic impurities such as iron, and the like and the calcium salt of the acid employed for acidulation. This impure phosphoric acid is preferably filtered or otherwise separated from the insoluble constituents prior to extraction. Alternatively, the mixture may be extracted in the presence of such insoluble materials.

Recovery of phosphoric acid from the above-described acidulation product is effected by contacting such product with a substantially water-immiscible organic extractant for phosphoric acid such as a trialkyl phosphate, e.g., tri-n-butyl phosphate, an aliphatic alcohol such as butyl alcohol, amyl alcohol, heptyl alcohol, or hexyl alcohol, esters such as ethyl acetate, cyclohexanol, methyl cyclohexanol, cyclohexanone, ethyl cyclohexanone, methyl ethyl ketone, ethers such as ethyl ether, propyl ether or isopropyl ether, amides such as N,N-di-butyloctanamide and the like as well as mixtures thereof. Such extraction agents should be miscible with water to no greater extent than about 10% by weight and may be used alone or in combination with diluents such as toluene, Varsol (an aliphatic hydrocarbon mixture), benzene, decane, mineral spirits, xylene, kerosene, or other diluent which is a solvent for the organic extraction agent, is substantially immiscible in water and is otherwise chemically inert to the system.

In carrying out the extraction, the aqueous reaction mixture is treated with the organic extractant, preferably a trialkyl phosphate, in a conventional liquid-liquid extraction apparatus, e.g., single or multiple stage mixer-settlers, countercurrent contactors and the like, advantageously at temperatures of from about 25° C. to about 10° C. or lower for a period of time of actual contacting, ranging from about 5 minutes to about 1 minute. The contact time will be selected so that substantially all of the phosphoric acid is extracted from the aqueous reaction mixture without simultaneous coextraction of appreciable amounts of the corresponding calcium salt. The volume ratio of organic extractant to aqueous reaction mixture will range from about 1:1 to about 5:1 or more with the preferred ratio being about 3:1. If diluents are used with the organic extractant, they may be used in concentrations which range from about 25 to about 75 percent of the total solution weight of the organic extractant.

At the end of the extraction period the aqueous phase is separated from the phosphoric acid-laden organic extractant phase and the aqueous phase may be used to obtain high purity calcium chloride.

Phosphoric acid prepared by the acidulation of calcium phosphate-containing ores contains an iron impurity, usually in substantial quantity. This iron impurity is predominantly in the ferric state with a small quantity being in the ferrous state. It is essential to the effective operation of the process of this invention that such iron impurity be removed or reduced to a very low level, e.g., below about 5 p.p.m. prior to treatment of the phosphoric acid with ammonia, otherwise an iron containing gel will precipitate, contaminate the product, make it incompletely water-soluble and lead to series filtration difficulties. Such iron impurity may be removed or greatly reduced in concentration by treating the aqueous acidulation product by known methods such as countercurrent extraction with a tertiary amine as described in Canadian Patent No. 725,549.

Calcium salts are usually extracted to some extent into the organic extractant along with the phosphoric acid and must be removed or reduced to a very low level prior to reaction of the phosphoric acid with ammonia, otherwise the product will be contaminated with insoluble calcium phosphate. This may be accomplished by any suitable means but it is conveniently accomplished by scrubbing the phosphoric acid-laden organic extractant with a small amount of water or phosphoric acid dissolved in water (about 15 to about 30% by weight acid concentration) prior to treatment with ammonia. This operation is usually carried out at about room temperature and utilizing a large excess of the organic phase to minimize loss of phosphoric acid. However, temperatures up to about 100° C. may be employed in the treatment. Such treatment usually reduces the calcium content of the phosphoric acid-laden organic extractant to less than 40 p.p.m.

The substantially iron and calcium impurity-free phosphoric acid-laden organic extractant is contacted with sufficient anhydrous ammonia to produce the desired ammonium phosphate. The ammonia reacts with the phosphoric acid to produce either ammonium dihydrogen phosphate, diammonium phosphate or mixtures thereof depending upon the ratio of ammonia to phosphoric acid. Where an excess of ammonia is used to produce diammonium phosphate, the reaction temperature may be easily controlled by refluxing excess ammonia to the reaction mixture. Such ammoniation reaction is carried out at a temperature of from about 20° C. to about 90° C., preferably from 25–40° C., lower reaction temperatures decrease the rate of reaction to an undesirable level.

If the reaction temperature is controlled within the above-defined range, the ammonium phosphate product precipitates in particulate form and readily may be separated from the organic extractant by conventional methods such as filtration, centrifuging and the like. It is usually advantageous to wash the solid ammonium phosphate with a low boiling hydrocarbon solvent such as pentane, methylene chloride and the like to remove organic extractant adhesive thereto and then dry such product to remove any residual hydrocarbon or excess ammonia.

The aqueous acid used to acidulate the calcium phosphate-containing ore will cause the phosphoric acid which is extracted by the organic extractant to contain a quantity of the anion of such acid. Such anion will be converted to its ammonium salt during treatment of the phosphoric acid with anhydrous ammonia. When such anion is a sulfate or a nitrate, the ammonium salt is not detrimental to fertilizer and therefore usually need not be removed. When such anion is chloride, however, it is advantageous to wash the ammonium phosphate product with anhydrous ammonia prior to drying. The anhydrous ammonia will dissolve any ammonium chloride present and permits its removal from the product.

In carrying out the process of this invention, therefore, calcium phosphate-containing ore is acidulated with a strong mineral acid, the phosphoric acid produced thereby is extracted from the reaction mixture with a water-immiscible organic extractant. Iron may be removed from the aqueous acidulation product or from the loaded organic solvent. Small amounts of calcium co-extracted with the phosphoric acid advantageously are removed by scrubbing the loaded solvent with small quantities of water. The resulting substantially iron and calcium free phosphoric acid-laden organic extractant then is treated with anhydrous ammonia at a temperature of between about 20° and 90° C. to produce a solid precipitate of the desired ammonium phosphate. The ammonium phosphate is then separated from the organic extractant, washed and dried to produce a completely water-soluble ammonium phosphate product. When hydrochloric acid is used to acidulate the ore and the product, therefore, contains small amounts of ammonium chloride, the additional step of washing the ammonium phosphate product with ammonia to remove the ammonium chloride may optionally be employed.

In order to provide ease in understanding, the following examples are set forth to illustrate the invention but are not to be construed to limit the scope thereof.

Example 1

A sample of phosphate rock ore was dissolved in an aqueous solution of hydrochloric acid and the mass was filtered to remove insoluble residue. The filtrate had an analysis of 16.8 weight percent phosphate, 24.7 weight percent chloride, 12.6 weight percent calcium and about 1 weight percent iron. A portion of this material was then reacted with sufficient gaseous chlorine to oxidize the iron content to the $Fe^{+++}$ valence state. The resulting solution was extracted with a 0.1 molar solution of tricaprylyl amine in a petroleum fraction having a boiling range of from 155° C. to 185° C. and containing about 96 percent aromatics. After separation of the aqueous phase from the amine-hydrocarbon phase, the aqueous phase was found to contain less than 5 parts per million iron. The aqueous phase thus produced was then extracted with a 50 volume percent solution of tri-n-butyl phosphate in Varsol (petroleum aliphatic solvent) to provide a phosphoric acid-laden extractant containing approximately 4 weight percent $H_3PO_4$. The acid-containing extractant was fed to a series of four standard mixer settlers and countercurrently contacted with 1 part of water for each 24 parts of acid containing extractant to remove a substantial portion of the calcium values therefrom. Analysis of the phosphoric acid contained in the tri-n-butyl phosphate extractant after treatment with water showed it to contain less than 40 parts per million calcium.

An excess of gaseous ammonia was then bubbled through the phosphoric acid-laden extractant at from about 26 to about 36° C. until all of the phosphoric acid had been converted to diammonium phosphate. The solid diammonium phosphate settled rapidly. The resulting slurry of diammonium phosphate and organic extractant was separated into two portions. The solid diammonium phosphate product was separated from the extractant by filtration and was washed with n-pentane. The white crystalline product which was obtained was readily and completely soluble in water and contained 2.8 weight percent chloride. A portion of the diammonium phosphate product was washed several times with liquid anhydrous ammonia and dried. Analysis of this material for chloride indicated that the so-washed product was substantially chloride free.

The second portion of the diammonium phosphate-organic extractant slurry was agitated under pressure with an equal volume of anhydrous liquid ammonia. Following the agitation, the reaction mixture was allowed to stand whereupon it settled into two layers. The bottom layer which consisted of a slurry of the diammonium phosphate in the organic extractant was separated from the upper layer of liquid ammonia. White solid crystalline diammonium phosphate product material was separated from the organic extractant and was washed with n-pentane. A standard silver nitrate test for chloride indicated the presence of substantially no chloride in the ammonium phosphate after treatment with the liquid ammonia.

Other similar experiments were conducted wherein the ammonia was contacted with the phosphoric acid-laden extractant at a temperature ranging from 14° C. to 90° C. At temperatures from about 20° C. to about 90° C. the reaction proceeded rapidly and an easily filtered water-soluble product was obtained. At temperatures below about 20° C., however, the reaction was undesirably slow.

A similar white, crystalline water-soluble ammonium phosphate product is obtained when the substantially iron free aqueous phosphoric acid is extracted with tri-n-butyl phosphate and the resulting extract treated in accordance with the procedural steps set forth directly hereinbefore.

Example 2

Another portion of the filtrate from an acidulated mass of phosphate rock ore from Example 1 was extracted with n-butanol to obtain a phosphoric acid-laden extractant containing approximately 15 weight percent $H_3PO_4$. An excess of gaseous ammonia was bubbled through the phosphoric acid-laden extractant at approximately 40° C. until the phosphoric acid had been converted to diammonium phosphate. The solid diammonium phosphate was separated from the extractant by filtration, washed with acetone and dried. The product was a white crystalline solid which was readily soluble in water.

Various modifications can be made in the present invention without departing from the spirit or scope thereof for it is understood that I limit myself only as defined in the appended claims.

I claim:

1. A process for the preparation of water-soluble ammonium phosphates which comprises extracting a substantially iron free aqueous phosphoric acid resulting from treating a calcium phosphate-containing ore with an aqueous solution of a strong mineral acid into a water-immiscible trialkyl phosphate extractant, separating the phosphoric acid-laden extractant from the residual aqueous phase, removing calcium impurities therefrom, contacting the phosphoric acid-laden extractant with anhydrous ammonia at a temperature of between about 20 and 90° C. and separating solid, water-soluble ammonium phosphate from the extractant.

2. The process of claim 1 wherein the strong mineral acid is hydrochloric acid.

3. The process of claim 1 wherein the strong mineral acid is sulfuric acid.

4. The process of claim 1 wherein the strong mineral acid is nitric acid.

5. A process for the preparation of water-soluble ammonium phosphate which comprises treating calcium phosphate-containing ore with an aqueous solution of hydrochloric acid to produce phosphoric acid, extracting the phosphoric acid in a trialkyl phosphate extractant from the aqueous solution, separating the phosphoric acid-laden trialkyl phosphate from the aqueous phase, treating said phosphoric acid-laden trialkyl phosphate to remove the iron and calcium impurities therefrom, treating the remaining phosphoric acid-laden trialkyl phosphate with anhydrous ammonia at a temperature of between about 20° C. and 90° C., separating a solid ammonium phosphate from the trialkyl phosphate solvent, washing said ammonium phosphate with anhydrous ammonia to remove the ammonium chloride therefrom and drying the remaining, solid, water-soluble ammonium phosphate.

6. A process for the preparation of water-soluble ammonium phosphate which comprises treating calcium phosphate-containing ore with an aqueous solution of hydrochloric acid to produce phosphoric acid, treating such phosphoric acid to remove the iron impurities therefrom, extracting the phosphoric acid into a trialkyl phosphate extractant, separating the phosphoric acid-laden trialkyl phosphate extractant, removing the calcium impurities therefrom, treating the calcium and iron-free phosphoric acid-laden trialkyl phosphate with anhydrous ammonia, at a temperature of between 20° C. and 90° C. separating a solid ammonium phosphate from the trialkyl phosphate solvent, washing said solid ammonium phosphate with anhydrous ammonia and drying the remaining solid, water-soluble ammonium phosphate.

7. The process of claim 5 wherein the trialkyl phosphate is tri-n-butyl phosphate.

8. The process of claim 6 wherein the trialkyl phosphate is tri-n-butyl phosphate.

References Cited

UNITED STATES PATENTS 1,929,442  10/1933  Milligan _____ 23—165

OSCAR R. VERTIZ, *Primary Examiner.*

L. A. MARSH, *Assistant Examiner.*